US006954940B2

(12) United States Patent  
Hsu

(10) Patent No.: US 6,954,940 B2  
(45) Date of Patent: Oct. 11, 2005

(54) MODULARIZED ELECTRONIC DEVICE ASSEMBLY ARCHITECTURE

(75) Inventor: Cheng-Chung Hsu, Taipei (TW)

(73) Assignee: Inventec Corporation, Taiwan (CN)

( * ) Notice: Subject to any disclaimer, the term of this patent is extended or adjusted under 35 U.S.C. 154(b) by 175 days.

(21) Appl. No.: 10/681,991

(22) Filed: Oct. 8, 2003

(65) Prior Publication Data

US 2005/0081224 A1 Apr. 14, 2005

(51) Int. Cl.[7] .............................................. G11B 17/03
(52) U.S. Cl. ..................................... 720/639; 361/685
(58) Field of Search .................. 720/639; 361/683–686

(56) References Cited

U.S. PATENT DOCUMENTS 5,943,208 A * 8/1999 Kato et al. .................. 361/685
6,172,867 B1 * 1/2001 Satou et al. ................. 361/680

* cited by examiner

Primary Examiner—George Letscher  
(74) Attorney, Agent, or Firm—Fulbright & Jaworski LLP

(57) ABSTRACT

A modularized electronic device assembly architecture is proposed, which is designed for the assembly of a modularized electronic device, such as a modularized hard disk drive, a modularized floppy disk drive, a modularized CD/DVD drive, and which is characterized by that the mounting and dismounting of the modularized electronic device to and from the base board can be both carried out effortlessly simply by hand without requiring technical personnel or user to use any assisting tools, such as screw drivers. This feature allows computer manufacturers to assembly electronic or computer systems more quickly and efficiently and thereby significantly reduce the required labor hours for the assembly work. Moreover, it also allows after-sale maintenance or upgrade to be carried out more quickly and efficiently.

5 Claims, 3 Drawing Sheets

MODULARIZED ELECTRONIC DEVICE ASSEMBLY ARCHITECTURE

BACKGROUND OF THE INVENTION

1. Field of the Invention

This invention relates to assembly technology for electronic and computer products, and more particularly, to a modularized electronic device assembly architecture, which is designed for the assembly of a modularized electronic device, such as a modularized hard disk drive, a modularized floppy disk drive, a modularized CD/DVD drive, onto a base board, such as a computer motherboard; and which is characterized by that the mounting and dismounting of the modularized electronic device to and from the base board can be both carried out effortlessly simply by hand without requiring technical personnel or user to use any assisting tools, such as screw drivers.

2. Description of Related Art

Modern assembly technologies for electronic and computer products is based on the concept of modularized design for all the functional units of an electronic or computer system, such as a modularized design for circuit boards, hard disk drives, floppy disk drives, CD/DVD drives, so that these modularized circuit boards or devices can be easily assembled to build a large electronic or computer system, or later integrated to the system to increase the functionality thereof.

Conventionally, a traditional way to integrate a modularized electronic device, such as a modularized hard disk drive, a modularized floppy disk drive, or a modularized CD/DVD drive, to a computer motherboard is to use screws or similar fastening means to fixedly secure the modularized device on the top surface of the motherboard. One drawback to this practice, however, is that the technical personnel or user must use screw drivers or similar assisting tools to fasten the screws during the mounting process; and thereafter when it is needed to remove the modularized device from the motherboard, it also requires the use of screw drivers to unfasten the screws to dismount the modularized device. This practice is undoubtedly quite laborious and time-consuming, which would increase labor hour in the assembly work and thus increase overall cost in the manufacture.

SUMMARY OF THE INVENTION

It is therefore an objective of this invention to provide a modularized electronic device assembly architecture which allows technical personnel or user to mount and dismount a modularized circuit board to and from a base board, such as a computer motherboard, effortlessly simply by hand without requiring the use of any assisting tools.

It is another objective of this invention to provide a modularized electronic device assembly architecture which can help allow the assembly process to be carried out more quickly and thereby help reduce the required labor hours and increase yield in manufacture.

It is still another objective of this invention to provide a modularized electronic device assembly architecture which allows after-sale maintenance or upgrade of the modularized electronic device to be carried out more quickly and efficiently.

The modularized electronic device assembly architecture according to the invention is characterized by the use of a supporting frame and a specially designed base board for the assembly of the modularized electronic device, wherein the supporting frame has a front side and an opposite back side and having a first edge and an opposite second edge, and the back side thereof is provided with at least one hook-shaped engaging structure on the first edge, and the second edge is provided with at least one tongue portion having a through hole therein; while the base board is formed with at least one engagement hole corresponding to the hook-shaped engaging structure on the supporting frame, at least one aligning post corresponding to the tongue portion on the supporting frame, and at least one elastic hooking member having a slanted sliding surface and a shouldered stopper surface and connected with the aligning post. During mounting process, the modularized electronic device is fixedly secured to the front side of the supporting frame, and then the supporting frame is mechanically coupled to the base board in such a manner that the hook-shaped engaging structure on the supporting frame is engaged to the engagement hole in the base board, and the through hole in the tongue portion on the supporting frame is slotted in the aligning post with the tongue portion being locked in position and stopped from being withdrawable by the elastic hooking member.

The modularized electronic device assembly architecture according to the invention allows the mounting and dismounting of the modularized electronic device to and from the circuit board to be both carried out effortlessly simply by hand without requiring technical personnel or user to use any assisting tools, such as screw drivers. This feature allows computer manufacturers to assembly electronic or computer systems more quickly and efficiently and thereby significantly reduce the required labor hours for the assembly work. Moreover, it also allows after-sale maintenance or upgrade to be carried out more quickly and efficiently.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The modularized electronic device assembly architecture according to the invention is disclosed in full details by way of preferred embodiments in the following with reference to the accompanying drawings.

Figure 1:
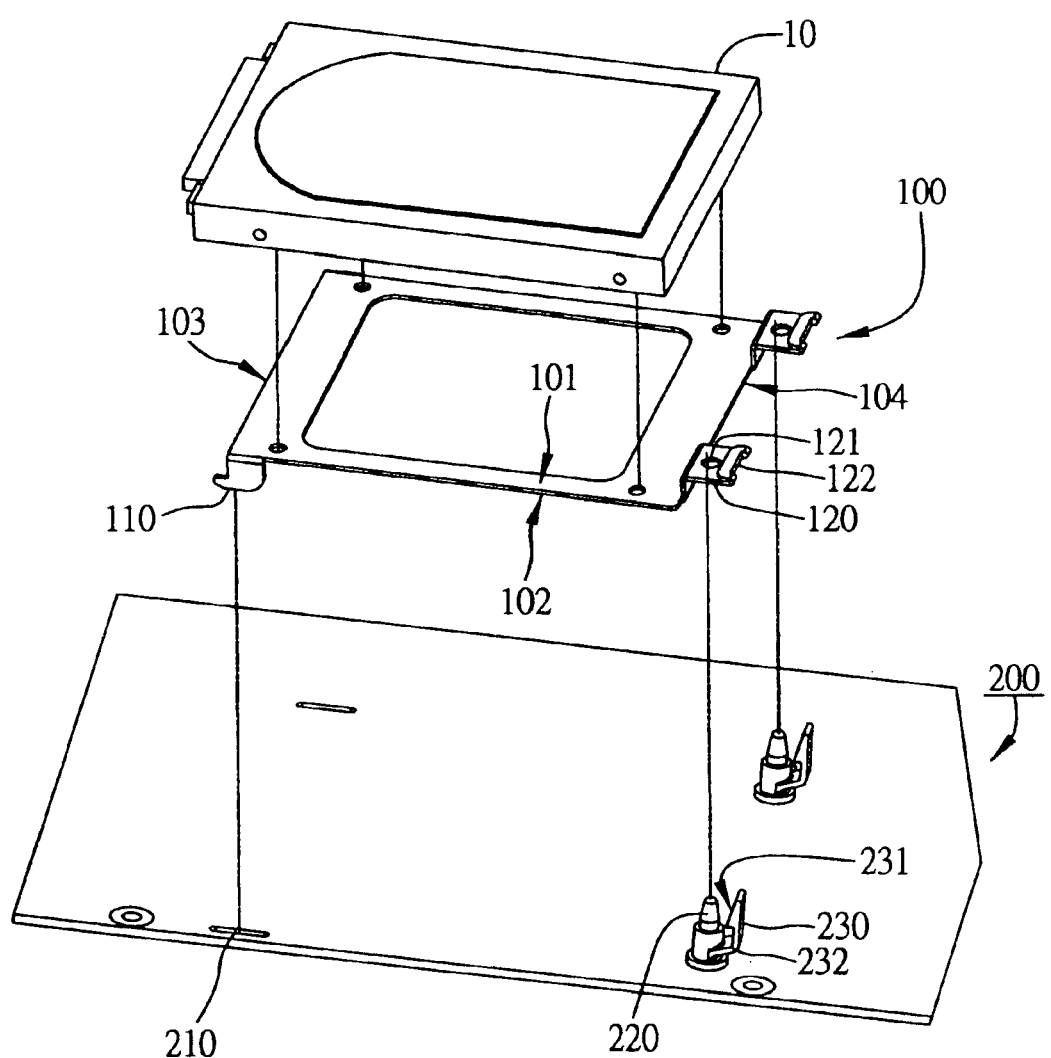
FIG. 1 is a schematic diagram showing an exploded perspective view of the modularized electronic device assembly architecture of the invention before being used for the assembly of a modularized electronic device.
Figure 2:
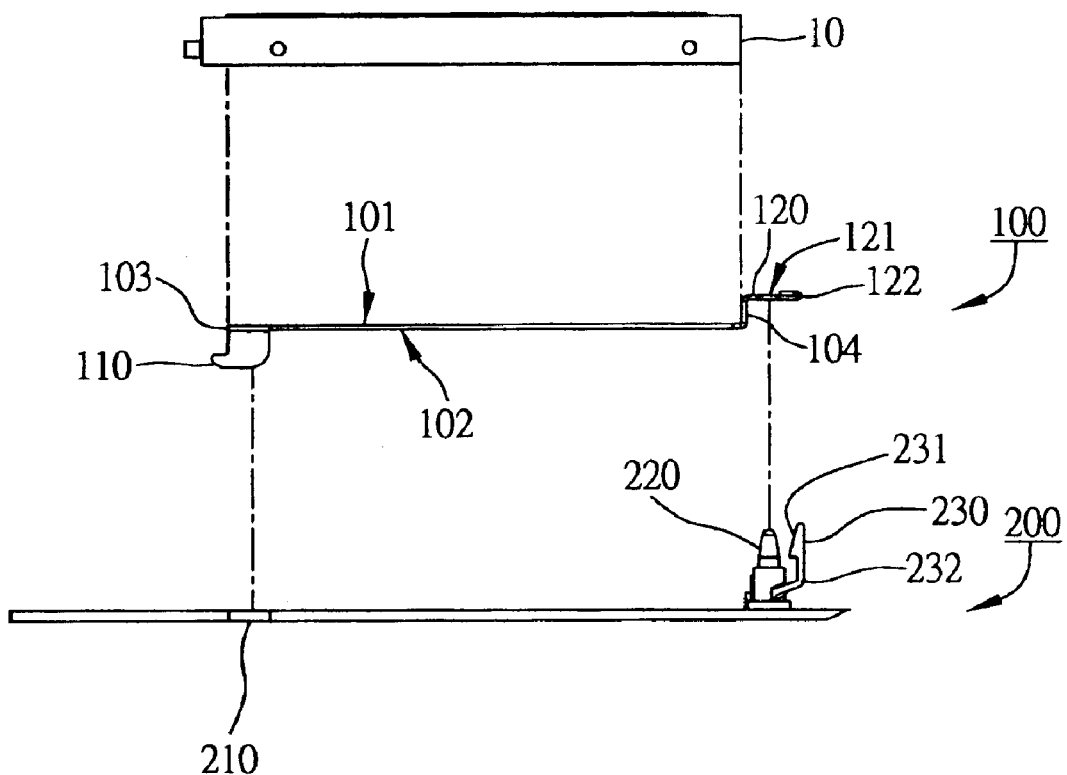
FIG. 2 is a schematic diagram showing the same of FIG. 1 in sectional view.

Referring first to FIG. 1 and FIG. 2, the modularized electronic device assembly architecture of the invention is designed for the assembly of a modularized electronic device 10, such as a modularized hard disk drive, a modularized floppy disk drive, or a modularized CD/DVD drive. Before the assembly process, it is required to first prepare a supporting frame 100 and a base board 200.

The supporting frame 100 is substantially rectangularly in shape, having a front side 101 and an opposite back side 102 and having a first edge 103 and an opposite second edge 104; wherein the back side 102 is provided with at least one hook-shaped engaging structure 110 on the first edge 103 (in the embodiment of FIG. 1, two engaging structures 110 are provided, but the number is unlimited and can be three or more), while the second edge 104 is provided with at least one tongue portion 120 having a through hole 121 therein (in the embodiment of FIG. 1, two tongue portions 120 are provided, but the number is unlimited and can be three or more). The front side 101 of the supporting frame 100 is dimensioned substantially equally to the size of the modularized electronic device 10 so as to be able to support the modularized electronic device 10 thereon.

The base board 200 is, for example, a computer motherboard, which is used for the mounting of the modularized electronic device 10 and various other electronic components (not shown) thereon. Structurally, the base board 200 is formed with at least one engagement hole 210 (in this embodiment, two engagement holes 210 are provided corresponding to the two engaging structures 110 on the supporting frame 100) and at least one aligning post 220 (in this embodiment, two aligning posts 220 are provided corresponding to the two tongue portions 120 on the supporting frame 100). In addition, each aligning post 220 is connected with an elastic hooking member 230 having a slanted sliding surface 231 and a shouldered stopper surface 232, wherein the slanted sliding surface 231 is slanted openly upwards in relation to the axis of the aligning post 220.

Figure 3:
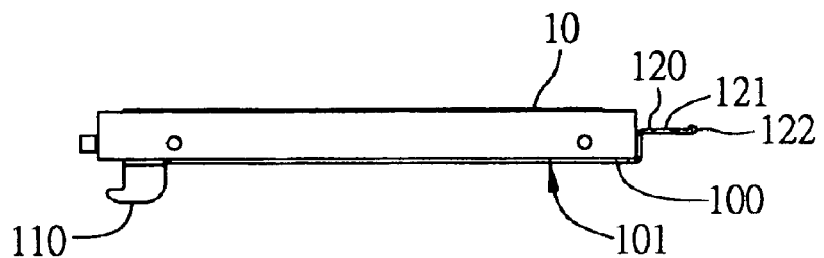
FIG. 3 is a schematic diagram showing a sectional view of the attachment of the modularized electronic device on a supporting frame.

Referring next to FIG. 3, during the assembly process, the initial step is to securely attach the modularized electronic device 10 to the front side 101 of the supporting frame 100 by means of, for example, screws, adhesion, and any other fastening means. In this embodiment, for example, the modularized electronic device 10 is securely attached to the supporting frame 100 by means of screws (not shown).

Figure 4:
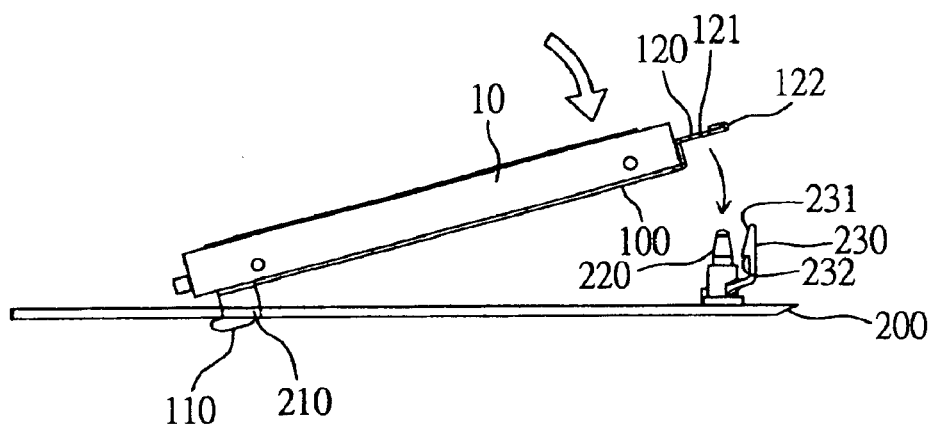
FIG. 4 is a schematic sectional diagram used to depict the engagement of the supporting frame to a base board.

Referring further to FIG. 4, in the next step, the supporting frame 100 is manually mounted by technical personnel onto the base board 200 by first inserting the hook-shaped engaging structures 110 on the supporting frame 100 respectively into the engagement holes 210 in the base board 200 for inserted engagement with the engagement holes 210, and then manually pressing the tongue portions 120 downwards against the aligning posts 220 on the aligning post 220.

Figure 5:
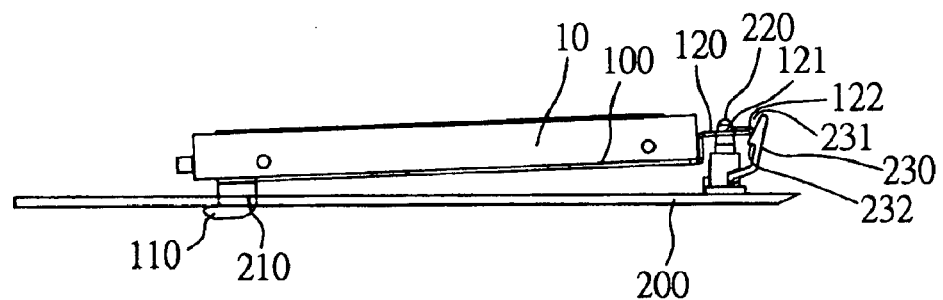
FIG. 5 is a schematic sectional diagram used to depict the locking of the supporting frame onto the base board.

Referring next to FIG. 5, during the downward pressing of the tongue portion 120 against the aligning post 220, the through hole 121 in the tongue portion 120 will come into inserted engagement with the aligning post 220, and meanwhile the outer edge 122 of the tongue portion 120 will come into and urge against the slanted sliding surface 231 on the elastic hooking member 230, causing the elastic hooking member 230 to be pushed outwards away from the supporting frame 100, thus allowing the tongue portion 120 to move on downwards without being impeded by the elastic hooking member 230.

Figure 6:
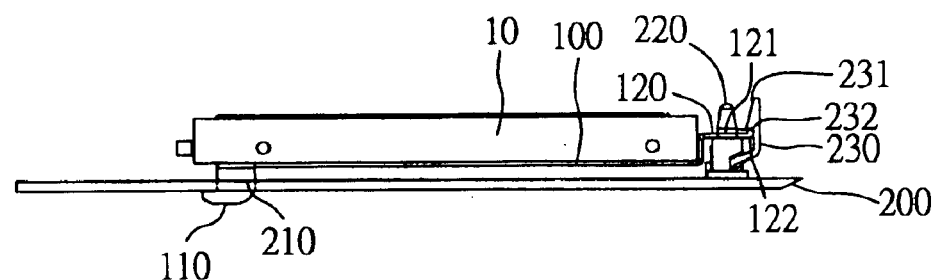
FIG. 6 is a schematic sectional diagram showing the finished assembly of the modularized circuit board on the base board by means of the modularized electronic device assembly architecture according to the invention.

Referring finally to FIG. 6, after the tongue portion 120 on the supporting frame 100 has passed the elastic hooking member 230, the elastic hooking member 230 will flip back toward the supporting frame 100 due to elastic restoration, causing the tongue portion 120 to be stopped by the shouldered stopper surface 232 from being withdrawable from the base board 200. This allows the supporting frame 100 together with the modularized electronic device 10 thereon to be securely fixed in position on the base board 200. This completes the assembly of the modularized electronic device 10.

Thereafter, whenever it is needed to remove the modularized electronic device 10 from the base board 200, the technical personnel or user simply needs to use his/her hand to push the elastic hooking member 230 outwards from the supporting frame 100 to release the locking mechanism and then use another hand to pull the modularized electronic device 10 upwards to dismount the modularized electronic device 10 from the base board 200. This dismounting process can be carried out effortlessly simply by hand without requiring the use of any assisting tools, such as screw drivers.

In conclusion, the invention provides a modularized electronic device assembly architecture which is designed for the assembly of a modularized electronic device, and which is characterized by that the mounting and dismounting of the modularized electronic device to and from the base board can be both carried out effortlessly simply by hand without requiring technical personnel or user to use any assisting tools, such as screw drivers. This feature allows computer manufacturers to assembly electronic or computer systems more quickly and efficiently and thereby significantly reduce the required labor hours for the assembly work. Moreover, it also allows after-sale maintenance or upgrade to be carried out more quickly and efficiently. The invention is therefore more advantageous to use than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A modularized electronic device assembly architecture for a modularized electronic device, which comprises:

a supporting frame having a front side and an opposite back side and having a first edge and an opposite second edge; wherein the back side is provided with at least one hook-shaped engaging structure on the first edge, and the second edge is provided with at least one tongue portion having a through hole therein; and a base board, which is formed with at least one engagement hole corresponding to the hook-shaped engaging structure on the supporting frame, at least one aligning post corresponding to the tongue portion on the supporting frame, and at least one elastic hooking member having a slanted sliding surface and a shouldered stopper surface and connected with the aligning post;

wherein the modularized electronic device is fixedly secured to the front side of the supporting frame;

and wherein the supporting frame is mechanically coupled to the base board in such a manner that the hook-shaped engaging structure on the supporting frame is engaged to the engagement hole in the base board, and the through hole in the tongue portion on the supporting frame is slotted in the aligning post with the tongue portion being locked in position and stopped from being withdrawable by the elastic hooking member.

2. The modularized electronic device assembly architecture of claim 1, wherein the modularized electronic device is a modularized hard disk drive.

3. The modularized electronic device assembly architecture of claim 1, wherein the modularized electronic device is a modularized floppy disk drive.

4. The modularized electronic device assembly architecture of claim 1, wherein the modularized electronic device is a modularized CD/DVD drive.

5. The modularized electronic device assembly architecture of claim 1, wherein the base board is a computer motherboard.

* * * * *